(12) United States Patent
Schnieders et al.

(10) Patent No.: US 7,943,714 B2
(45) Date of Patent: May 17, 2011

(54) LABEL ADHESIVE AND ACTIVATION METHOD FOR POLYMERIC LABEL

(75) Inventors: Lawrence J. Schnieders, Eastlake, OH (US); Alexander V. Lubnin, Copley, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 413 days.

(21) Appl. No.: 11/854,690

(22) Filed: Sep. 13, 2007

(65) Prior Publication Data

US 2008/0060756 A1 Mar. 13, 2008

Related U.S. Application Data

(60) Provisional application No. 60/825,438, filed on Sep. 13, 2006.

(51) Int. Cl.
*C08F 118/02* (2006.01)
*C08F 120/06* (2006.01)
*C09J 5/00* (2006.01)
*C08K 13/08* (2006.01)
*C08J 3/00* (2006.01)

(52) U.S. Cl. .................. 526/319; 526/317.1; 156/308.6; 525/383; 524/522

(58) Field of Classification Search ............... 526/317.1, 526/319; 525/383; 524/522; 156/308.6
See application file for complete search history.

(56) References Cited

U.S. PATENT DOCUMENTS

| 6,306,242 B1 * | 10/2001 | Dronzek | ................ 156/308.8 |
| 6,517,664 B1 | 2/2003 | Dronzek, Jr. | |
| 6,663,746 B2 | 12/2003 | Dronzek | |
| 6,803,100 B1 | 10/2004 | Hintz et al. | |

FOREIGN PATENT DOCUMENTS

| GB | 1333710 A | 10/1973 |
| WO | 97/43744 A1 | 11/1997 |
| WO | 02/14448 A2 | 2/2002 |
| WO | WO 0214448 A2 * | 2/2002 |

* cited by examiner

*Primary Examiner* — Michael M Bernshteyn
(74) *Attorney, Agent, or Firm* — Samuel B. Laferty

(57) ABSTRACT

A water activated adhesive system is described that is particularly suited for applying non-paper polymeric labels to surfaces which have low moisture permeability. The adhesive system is characterized by a dry non-tacky surface that becomes tacky in less than one second when contacted with a water-based activator. While it is a water activated adhesive, it is also characterized after aging bonded to a substrate by resistance to adhesive failure during 72 hours of immersion in ice/water mixture. The adhesive is beneficial to allow use of existing paper labeling equipment with polymeric labels.

20 Claims, No Drawings

LABEL ADHESIVE AND ACTIVATION METHOD FOR POLYMERIC LABEL

CROSS REFERENCE

This application claims priority from U.S. Provisional Application Ser. No. 60/825,438 filed on Sep. 13, 2006.

FIELD OF INVENTION

An adhesive system that can be activated with water-based activators and the water-based activator for use with automatic labeling machines are disclosed. The adhesive can go from a humidity-resistant non-tacky stackable and storable adhesive in the form of a dry film/layer to a high tack adhesive in a fraction of a second after contact with an activation solution. Besides being quickly activated, the adhesive desirably withstands extended immersion in ice/water without losing its adhesive bond. Preferred substrates are metal, plastic, and glass.

BACKGROUND OF THE INVENTION

U.S. Pat. Nos. 6,306,242; 6,517,664, and 6,663,746 disclose methods for labeling plastic, glass or metal containers or surfaces with polymeric labels. The patents deal with unique problems associated with polymeric labels. Polymer labels are relatively hydrophobic and non-permeable to moisture in most cases, as contrasted with paper labels, which are inherently hydrophilic and have relatively high moisture adsorption and transmission rates. The patents include the steps of applying a layer of hydrophilic solid material to a polymeric label to form a hydrophilic layer, applying water or a water-based adhesive to the hydrophilic layer to form a fastenable polymeric label, fastening the fastenable polymeric label to a glass, plastic or metal containers or surface, and allowing said polymeric label adhesive to dry on the glass, plastic or metal container or surface. The patent examples do not illustrate high speed label application rates and do not have acceptable ice/water immersion resistance of the applied labels.

Other methods of functionally activating an adhesive to go from non-tacky to tacky state in a short time are known. One method employs a release layer that protects the tacky surface until applied, also called pressure sensitive adhesives. Another method is heat activation of an adhesive. With machine-applied labels, there is strong economic incentive to label containers/bottles at high rates to achieve economies of operation. This requires activation from non-tacky to tacky in less than a second. It would be economically advantageous if synthetic polymeric labels could be applied using glue applied paper label equipment already in place and minimally modified. Polymeric labels offer opportunities for moisture resistant completely or partially clear labels and a variety of other visual effects that may have consumer appeal.

SUMMARY OF THE INVENTION

An adhesive is described for non-paper polymeric labels that is activatable in less than 0.1 seconds, has sufficient tack after activation to operate well with existing paper labeling machines designed for applying water-based adhesive to paper labels and exhibits excellent resistance to long term water immersion at around 0+/−1° C. (31-33° F.) without losing adhesion. These qualities are necessary for applications such as beer bottle adhesives where cold beverages are desired by the consumer. The polymeric label can optionally be clear or partially clear and need not have any significant moisture transmission or adsorption to facilitate removal of water from the activation solution during bonding. The adhesive makes use of a hydrophilic polymer layer as described in the prior art but a) uses a blend of two or more polymers or b) a sulfonic or phosphonic acid and/or their salts containing repeat unit to provide better hydrophilic properties in selected performance criteria, e.g., rapid activation to a tacky state, while having sufficient resistance to ice water immersion. Acid-base interactions between the activator and adhesive layer sometimes speeds the uptake of the activation solution onto the adhesive layer.

DETAILED DESCRIPTION OF THE INVENTION

Plastic, glass, and metal containers or bottles are prevalent in a wide variety of shapes and sizes for holding many different types of materials such as detergents, chemicals, motor oils, beverages, etc. These containers are glass, plastic, or metal, optionally including (mono or multi layers) of polyethylene, polypropylene, polyester or vinyl along with other specialty blends for specific barrier and product resistance performance. Generally, such containers are provided with a label which indicates the trade name of the product and may contain other information as well.

Water-based or water-activated technology has grown and been employed for many years and consequently there are many existing machines that have been installed for this type of labeling technique such as from Krones, Neutraubling, Germany which run precut labels or Koyo, Japan which run roll stock that is cut on machine to the label size. The cut label techniques and associated adhesives work well with paper, which has moisture permeability, and allows the moisture from the water carrier to be absorbed by and dry through the paper base. The opacity of the paper negates the requirement for the adhesive to be optically clear.

Typically, wet-applied cut label machines operate by a mechanism where glue pallets remove the label out of the label holding magazine while simultaneously gluing the back side of the label (portion to be applied to container). This is accomplished by applying a thin glue film or activator to the pallet which is then pressed in intimate contact against the first label in the stack. After its removal, the label sticks on the entire glued area of the pallet until transferred to a "gripper" cylinder and removed from the pallet. The gripper cylinder then transfers the label to the container to be labeled. The various machine designs and techniques are well known within the labeling industry and to those skilled in the art. The "Krones Manual of Labeling Technology" by Hermann Kronseder dated December 1978, is hereby incorporated by reference. This technique obviously will not work with non-porous polymeric (non-cellusic) substrates as the adhesive can not quickly wick into the polymeric substrate for initial tack and adhesive transfer to the label or drying through the plastic.

Attempts have been made to use polymeric substrates with increased moisture vapor transmission rates (MVTR) and tacky or pressure sensitive adhesive on conventional labeling equipment with little success. The tacky adhesive required to stick to the polymeric substrate causes machining problems by gumming up the adhesive application system and creates cleanup issues. The high MVTR (porous) substrates also did not have good wet tack with existing commercially available adhesives that would machine process without problems. They also did not dry rapidly enough, which made the labels prone to "swimming" or moving from the desired application area during down stream processing. In addition, the adhesives did not wet out and apply uniformly to non-hydrophilic surfaces with the crude adhesive metering and application systems currently in use on existing paper labeling machinery. Without uniform application, wet out and wet tack, it will be impossible to apply a clear label that has the no-label look because of adhesive and application imperfections.

Accordingly, it is an object of this invention to provide a polymeric label adhesive particularly adapted for use in post-mold wet-applied labeling of surfaces such as polymeric, glass and metal containers that would readily feed from the label magazine or gripper, adhere with sufficient tack to the final container without moving on the surface through post labeling handling and processing including but not limited to conveying, filling, and case packing. It is also desirable that the final adhesive withstands hours of immersion in ice water without loosening from the substrate or becoming detached, withstands storage as a stack of labels in 80% relative humidity at 20-30° C., and not suffer adhesive failure when exposed to water in final use as a label. Earlier work by Peter Dronzek (U.S. Pat. Nos. 6,306,242; 6,663,746; and 6,517,664) included adding a hydrophilic layer to the polymeric label to make it behave more like a cellulosic label. This work further extends that work by providing a) a blend of at least two polymers in the adhesive, one having a more hydrophilic nature (generally water soluble under the label application conditions) than the other and responding more rapidly than the other to water activation or b) using a polymer with repeat units having carboxylic, sulfonic or phosphonic acid groups and/or their salts. The less hydrophilic polymer (generally characterized as a dispersion of polymer in water rather than a water soluble polymer under application conditions) helps promote adhesion to the polymeric label and the substrate, and minimizes water adsorption during ice-water immersion.

An improvement in the process by which a polymeric label may be applied to a surface such as glass, plastic or metal container or surface by means of a water activated adhesive comprising at least two polymers of different hydrophilicity is disclosed. The use of two different polymers allows one very hydrophilic polymer to develop quick tack when exposed to water-based activation solution composition, while said second polymer (less hydrophilic) can promote adhesion of the adhesive to the polymeric label and substrate, reduce tackiness under high humidity storage, provide block resistance, and provide resistance to adhesive failure during ice-water immersion.

The first polymer is characterized by being at least 50 wt. % thermodynamically soluble in aqueous media at 25° C. The water-based (aqueous media soluble) solution need not be entirely based on water, but can contain a few percent of polar organic solvents such as low molecular weight alcohols, ketones, etc., that are soluble at 25° C. to an extent of at least 20 wt. % in water. In other embodiments, at least 75, 85, or 95 wt. % of the first polymer is thermodynamically soluble in said water-based solutions at 25° C. In one embodiment, the first polymer is any natural or synthetic polymer (preferably synthetic). In another embodiment, the first polymer is limited to a vinyl addition polymer. If the first polymer is a vinyl addition polymer, it can be polymerized by a variety of polymerization methods so long as the final polymer has the required solubility (preferably free radically polymerized vinyl addition). In one embodiment, the first polymer has a number average molecular weight of at least about 1000 daltons, in another embodiment at least about 1500. In one embodiment, the first polymer has a number average molecular weight of less than about three million, in another embodiment less than two million, and in another embodiment less than 500,000 and in another embodiment from 1500 to 500,000.

In one embodiment, the first polymer has an acid number before neutralization of at least 100 or 500 mg KOH/g polymer, in another embodiment of at least 600 mg KOH/g of polymer, and in still another embodiment of at least 700 mg KOH/g of polymer. The acid number in one embodiment is desirably less than 1500 mg KOH/g polymer, in another embodiment less than 1200 mg KOH/g of polymer, and in another embodiment less than 1000 mgKOH/g of polymer. In one embodiment, the first polymer is desirably present in the final label and adhesive composition in an amount of at least 5 or 20 wt. % of the total polymers and desirably less than 90, 50, or 40 wt. % of the total polymers, e.g., from about 5 to about 50 or 90 wt. % of the total polymers in the adhesive, in another embodiment the first polymer is present from about 5 to about 40 wt. %, and in another embodiment said first polymer is present from about 20 to about 40 wt. % of the polymer in said adhesive. In one embodiment, the solubility of the first polymer is derived from carboxylic acid groups, sulfonic acid groups, phosphonic acid groups and/or their salts, or combinations thereof. The glass transition temperature of this first polymer can vary significantly and can be quite high due to the fact that this polymer performs the function of providing tacky adhesion while highly hydrated with a water-based solution. The first polymer can be a single polymer or a blend of several polymers that each meets the limitations of a first polymer.

The second polymer is desirably mostly a dispersion of polymer in an aqueous medium, rather than a solution of polymer in water. Thus, the second polymer is characterized by low solubility in water or limited solubility in water as contrasted with the first polymer. The second polymer can be prepared by emulsion polymerization, solution/dispersion polymerization, bulk polymerization, polymerization in solvent, etc. If the polymer is initially prepared in a nonaqueous system, it can be dispersed after polymerization by a variety of techniques well known to the art. The second polymer can be a single polymer or a blend of several polymers each having the properties of a second polymer. In one embodiment, the second polymer is desirably present in an amount of at least 10, 50 or 60 wt. % of the total polymers and in an amount less than 95, 90, or 80 wt. % of the total polymer, e.g., of 10 or 50 to 95 wt. % of the total weight of the adhesive in the final label adhesive, in another embodiment from about 60 to 95 wt. % of said total weight, and in a third embodiment from about 60 to 80 or 90 wt. % of said total weight. In one embodiment, the acid number before any neutralization of the second polymer is not important, in another embodiment the acid number is less than 300 mg KOH/g of polymer, in another embodiment less than 200 mg KOH/g and in yet another embodiment it is less than 100 mg KOH/g of polymer. The glass transition temperature of said second polymer in one embodiment is desirably at least −10 or 10° C. and desirably less than about 50 or 30° C., e.g., from about −10 to about 50° C. Often, the glass transition temperature is from about 10 to about 30° C.

When the first and second polymers are vinyl addition polymers, they can be made from the same monomers, but the amount of the monomers providing water solubility in the polymer are much higher in the first polymer than in the second polymer.

Monomers A of a relatively hydrophobic nature suitable for use in the first and/or second polymer include:

a1) Esters of acrylic and methacrylic acid [hereinafter jointly (meth)acrylic], of which the acrylic esters are preferred.

a2) Ethylenically unsaturated nitriles such as acrylonitrile and methacrylonitrile, of which acrylonitrile is preferred.

a3) Vinyl esters, of which vinyl acetate, vinyl propionate, vinyl esters of alpha-branched monocarboxylic acids, for example VeoVa9™, VeoVa10™, or VeoVa11™ and also vinylformamide are preferred.

a4) Aromatic vinyl monomers such as styrene and divinylbenzene, of which styrene is very particularly preferred.

a5) Ethylene, propylene, isobutylene, unsaturated $C_4$-$C_8$ dienes such as butadiene or isoprene, vinylidene chloride and vinyl chloride, of which butadiene is particularly suitable.

a6) Vinyl ethers such as vinyl methyl ether, vinyl ethyl ether and diethylene glycol monomethyl vinyl ether.

Monomers B of a relatively hydrophilic nature for use in the first and/or second polymer include monomers selected from:

b1) Ethylenically unsaturated carboxylic acids or anhydrides and also sulfonic and phosphonic acids such as acrylic acid, methacrylic acid, (meth)acrylamidoglycolic acid and esters and/or ether derivatives thereof, itaconic acid, fumaric acid, maleic acid, vinylphosphonic acid, vinylsulfonic acid, styrene sulfonic acid, maleic anhydride and methacrylic anhydride, acrylamido-2-methylpropanesulfonic acid. Very particular preference is given to methacrylic acid, acrylic acid, itaconic acid and acrylamidoglycolic acid.

b2) Ethylenically unsaturated amides and derivatives thereof. Particularly suitable and preferred are acrylamide, methacrylamide and also alkyl acrylamidoglycolates and/or alkyl ethers thereof. The N-methylol derivatives of acrylamide and methacrylamide are used at below 5% by weight, but preferably they are not used at all.

b3) Of the hydroxyalkyl esters of acrylic and methacrylic acids, 2-hydroxyethyl acrylate, 2- and 3-hydroxypropyl acrylates, 4-hydroxybutyl acrylate, 2-hydroxyethyl methacrylate, 3-hydroxypropyl methacrylate and also reaction products of mono- and disaccharides with acrylic acid or methacrylic acid are preferred. Very particular preference, however, is given to using hydroxyethyl acrylate.

b4) Hydrophilic monomers such as acrylonitrile, acrolein, methyl vinyl ketone, vinyl acetate, methyl acrylate, ethyl acrylate, vinyl propionate are likewise suitable and preferred for raising the hydrophilicity of the addition polymers.

Said relatively hydrophilic monomers b1) may in part also be used in neutralized form or, after the polymerization has taken place, be (partially) neutralized so that the pH of the binder dispersion is between 1 and 7.

Suitable neutralizing agents include not only ammonia and other amines such as ethanolamine or triethanolamine but also salts or oxides of alkali metals, alkaline earth metals or else other metals, for example sodium hydroxide solution, sodium bicarbonate, calcium hydroxide, zinc oxide, magnesium oxide or sodium pyrophosphate. The addition of such substances to the electrolyte-stable dispersions of this invention has a buffering effect and enhances the colloidal stability of the dispersions during their preparation, transportation or processing.

A particularly preferred polymer includes repeating units in the amount of at least 50 wt. % and desirably 98, 95, or 90 wt. % or less of the above described addition monomers along with at least 2, 5, or 10 wt. % and desirably less than 50 wt. % of repeating units from unsaturated sulfonic acid or sulfonic acid salt containing monomer such as 2-acrylamido-2-methylpropane sulfonic acid or its salt, e.g., from about 50 to about 90, 95, or 98 wt. % repeat units derived from polymerizing said vinyl addition monomers and from about 2, 5, or 10 to about 50 wt. % of repeating units from said unsaturated sulfonic acid or its salt. These sulfonic acid containing monomers have been able to provide sufficient properties to the resulting polymers to allow them to be used as a one component film that only requires water activation to function as a label adhesive with quick generation of sufficient tack for high speed paper labeling machines. These polymers may also be used with a second polymer as earlier described to form an adhesive film from two or more polymers. It has been noted that having the repeating units from sulfonic acid containing monomers in both the polymer of the adhesive film and any other polymer used in the adhesive composition (i.e., another polymer in combination with the polymer in the film or a second polymer used in the water activation solution) is more desirable than just having repeat units of the sulfonic acid monomer in a single polymer of the adhesive.

Hydrophilic materials selected for use in the film or activation solution are chosen for their inherent hydrophilicity, coefficients of expansion or contraction, and modulus of elasticity. When applied to a polymer film, it will result in a label face stock that will have hydrophilicity, water adsorptivity, wet tack and drying properties that will permit the polymer film to be applied to a surface such as a polymeric, glass or metal containers via water-based labeling techniques on standard paper labeling equipment.

The hydrophilic layer, which may be applied by either a coating, spray, or extrusion technique, has the function of absorbing a water or moisture to activate the layer and thereafter a) function as an adhesive without any applied adhesive or b) absorb the moisture from an activation solution that may contain low molecular weight adhesives, such as sodium silicate, poly(acrylic acid) and (meth)acrylic acid copolymers, and cause the polymer film to adhere to a surface such as glass, plastic or metal container and to set up rapidly and positively. It is also possible to co-extrude the hydrophilic layer with the polymer film layer.

As used herein and in the appended claims, the term "hydrophilic" is used to describe materials or mixtures of materials which have a tendency to bind or absorb water. The preferred hydrophilic materials are those acrylic polymers which bind or absorb water and become adhesives such as poly(acrylic acid), (meth)acrylic acid copolymers or poly (sodium acrylate).

The use of the proper hydrophilic polymer or blend in the adhesive layer(s)/film for a given polymeric labeling substrate and container to be labeled will have a direct effect on the speed at which the labeling line can be run.

When choosing the material which forms the adhesive hydrophilic layer(s), which may be applied by coating, co-extrusion or extrusion, one must consider the label substrate, container to be labeled, labeling machinery, water or adhesive application technique and down stream processing requirements such as filling, conveying and packing. In addition, the final appearance of the label such as the clear no-label look or a plain opaque label must be considered when choosing the components of the hydrophilic layer. Generally, a deposit of from 1.0 to 8 lbs/3000 ft$^2$ of the hydrophilic layer, when dried, may be employed on the polymeric film layer, depending on the particular hydrophilic material that is selected.

The activation solution or activator may be just water or water with one or more additives, such as adhesives, crosslinkers, silicates, (meth)acrylic acid polymers or copolymers, etc. It is critical to the successful application of a hydrophilic polymeric film label to control how the activation solution and/or water-based adhesive is applied to the hydrophilic layer, how deposition (weight or thickness) is controlled and how the resultant combination with the container is pressed together. Generally, from 0.25 to 1.5 g/sq. ft. of water or water-based adhesive is applied to the hydrophilic layer with 100% coverage of the label. If a grid or other pattern of adhesive is employed, then the amount of adhesive may be reduced. If a grid pattern is employed, the hydrophilic layer may be applied to be substantially in register with the adhesive layer. It will generally be possible to reduce the typical amount of adhesive applied to a label when using the hydrophilic layer of the invention to an amount which is 20-80% of the amount that is typically employed for affixing paper labels to a surface. The choice of the hydrophilic layer(s) and the type of label substrate and container to be adhered together, as discussed above, the plant processing conditions after labeling, storage requirements and the end use requirements that must be met such as high temperature resistance or resistance to adhesive failure during ice water immersion and the choice of an intermediate adhesive layer (if any) are important considerations. There are many more specific variables within these considerations all of which influence the formulation of the proper hydrophilic layer and adhesive (if used) for a specific application.

Crosslinking and coupling agents can be added to the adhesive film and/or the activation solution. Examples of crosslinking agents include zirconium salts, such as Bacote 20 from Magnesium Elektron, Inc., polyfunctional aziridine such as Xama-2 from EIT, Inc., isocyanates, carbodiimides, and water soluble polyamide-epichlorohydrin material such as Polycup 17.

Various sources of silane functionality may be used at a level of 0.2-8% by weight of the activation solution and/or adhesive composition. There are several ways to incorporate silane functionality into the composition of the present invention. One way is by using silane monomers which contain at least one polymerizable and at least one silane group and are represented by a general formula: C=C~~SiR$_3$ where C=C is polymerizable group such as vinyl, vinylidene, acrylic, methacrylic, allylic, methallylic, styrenic and alike. Another way is by using silane-containing chain transfer agents represented by general formula: X—Y~~SiR$_3$, where X—Y~~ is a group with at least one abstractable atom X. Examples include compounds with groups containing labile hydrogen atoms such as thiols, halogenated species, etc., such as 3-mercaptopropyltrimethoxysilane. Yet another way is by using silane agents which can form salts with the polymers of the present invention through neutralization reaction or Lewis acid-base interaction or react with functional groups on the polymer. Examples include neutralization of acids with amines and reaction epoxy groups with carboxylic acids.

Examples of useful silane monomers and reagents include silane functional vinyl monomers such as vinyltrimethoxysilane, vinyldimethylethoxysilane, vinylmethyldiacetoxysilane, vinylmethyldiethoxysilane, vinyltriacetoxysilane, vinyltriethoxysilane, vinyltrilsopropoxysilane, vinyltrimethoxysilane, vinyltriphenoxysilane, vinyltri(t-butoxy)silane, vinyltris(isobutoxy)silane, vinyltris(isopropenoxy)silane, vinyltris(2-methoxyethoxy)silane, vinyltriacetoxysilane, silane functional acrylate and methacrylate monomers, such as 3-methacryloyloxypropyltrimethoxysilane, 3-acryloyloxypropyltrimethoxysilane, 3-methacryloyloxypropyltriethoxysilane, 3-methacryloyloxypropylmethyldimethoxysilane, 3-acryloyloxypropylmethyldimethoxysilane, 3-methacryloyloxypropyldimethylethoxysilane, 3-methacryloyloxymethyltriethoxysilane, 3-methacryloyloxymethyltrimethoxysilane, 3-methacryloyloxypropyldimethylethoxysilane, 3-methacryloyloxypropenyltrimethoxysilane, and 3-methacryloyloxypropyltrimethoxysilane, and combinations thereof. Other example of useful compounds unclude trimethoxysilylbenzoic acid, aminopropyltriethoxysilane, isocyanatopropyltriethoxysilane, glycidoxypropyltrimethoxysilane, (3,4-epoxycyclohexyl)ethyltrimethoxysilane, N-(3-triethoxysilylpropyl) methoxyethoxyethyl carbamate, N-(3-triethoxysilylpropyl) methoxyethoxyethyletlhyl carbamate, vinyltri(2-methoxyethoxy)silane, vinyltriphenoxysilane, vinyltriisopropoxysilane, vinyltri-t-butoxysilane, divinyldiethoxysilane, glycidoxypropyltrimethoxysilane, allyltriethoxysilane allyltrimethoxysilane, (3-acryloxypropyl)dimethylmethioxysilane, (3-acryloxypropyl)methyldimethoxysilane, (3-acryloxypropyl)trimethoxysilane, (methacryloxymethyl) dimethylethoxysilane, methacryloxymethyltriethoxysilane, methacryloxymethyltrimethoxysilane, methacryloxypropyldimethylethoxysilane, methacryloxypropyltrimethoxysilane, styrlethyltrimethoxysilane, mercaptomethylmethyldiethoxysilane, 3-mercaptopropylmethyldimethoxysilane-, 3-mercaptopropyltriethoxysilane, 3-mercaptopropyltrimethoxysilane; at least partial hydrolysates thereof or mixtures thereof.

Examples of commercial silane agents:
Silquest™ A-171=vinyltrimethoxy silane, Silquest™ A-151=vinyltriethoxy silane, CoatOSil™ 1706=vinyltriisopropoxy silane, CoatOSil™ 1757=3-methacryloxypropyltriisopropoxysilane, Wetlink™ 78=epoxysilane, Silquest™ A-2639=aminosilane, and Silquest™ A2287; all available from Momentive Performance Materials, Inc.

Other examples are compiled in the table below.
1. Polysulfides: Bis-[3-(triethoxysilyl)-propyl]-tetrasulfide and Bis-[3-(triethoxysilyl)-propyl]-disulfide
2. Mercaptanes: 3-mercaptopropyltrimethoxysilane and 3-mercaptopropyltriethoxysilane
3. Amines: 3-aminopropyltriethoxysilane and N-2-(aminoethyl)-3-amino propyltrimethoxysilane
4. Vinyl Compounds: Vinyltrimethoxysilane and Vinyl-tris (2-methoxyethoxy)silane
5. Methacrylate: 3-methacryloxypropyltrimethoxysilane
6. Epoxides: 2-(3,4-epoxycyclohexy)-ethyl trimethoxysilane and 3-glycidoxy-propyltriethoxysilane
7. Isocyanate: 3-isocyanatopropyltriethoxysilane
8. Thiocyanate: 3-cyanatopropyltriethoxysilane The coated, sprayed, extruded, or co-extruded hydrophilic adhesive layer(s) functions in effect as an adhesive layer which is defined as a substance capable of combining two surfaces by the formation of a bond whether it is a moist hydrophilic layer to glass or polymer or a dry hydrophilic layer to a wet labeling adhesive which is an intermediate layer that bonds to both the hydrophilic layer and glass or polymer of the container when dry.

In mechanical as well as specific adhesion, the hydrophilic layer(s) with optional intermediate adhesive layer(s) must "wet" both surfaces completely or weak bonded areas will develop as it dries or "sets" resulting in a poor bond. To facilitate wetting of the surface and penetration, the hydrophilic layer or hydrophilic layer with intermediate adhesive must be in a fluid state which for purposes of this invention is accomplished by applying water or water-based adhesive to the selected hydrophilic layer which when applied to the container to be labeled brings the hydrophilic layer and container wall into intimate molecular contact. By using a wet hydrophilic layer or intermediate adhesive which also wets and penetrates the hydrophilic layer as well as the container surface, a fluid region is created that flows to cover the surface as completely as possible. This is critical to the invention where even an apparently smooth surface in reality is composed of a random network of hills and valleys. When the hydrophilic layer is in the wet condition, with or without adhesive, it serves as a wetting bridge to promote adhesion.

It is clear that one specific hydrophilic layer may not fit all applications but hydrophilic layers can be tailored to particular applications based on the conditions and requirements for wet post-mold labeling of polymeric substrates.

It is also an object of the invention to provide a polymeric label adhesive particularly adapted for use in post mold wet applied labeling of polymeric and glass containers that would have sufficient wet tack and affinity for water, a water-based solution or adhesive used to allow for transfer of the water, water-based activation solution or water-based adhesive to the polymeric label substrate from the applicator roll(s), pad(s) or pallet(s) of the labeling machine.

It is also an object of the invention to provide a polymeric label for use in post mold wet applied labeling of polymeric and glass containers that would have a coefficient of expansion or contraction under the conditions which the container sees which is the same or compatible with that of the polymeric resin, glass or metal from which the container is made so that expansion and contraction of the container will not wrinkle or otherwise affect the integrity of the label.

It is also an object of the invention to provide a polymeric label for use in wet applied post mold labeling which would combine suitable properties of modulus of elasticity and flexibility and would not be degraded by handling and flexing of the subsequent container. Finally, it is an object of this invention to provide a polymeric label and adhesive therefore that is resistant to ambient humidity activation and/or adhesion to the adjacent labels during storage prior to use.

It is a further embodiment of the invention to use the disclosed adhesive system with paper labels, combinations of paper and other non-paper materials, and metals (such as metal foils) in a label. Advantages of the adhesive system for paper includes operability with existing paper labeling equipment, good humidity resistance of the adhesive system on pre-glued labels, rapid activation to a tacky state, and good resistance to ice-water immersion. Advantages of said adhesive system for metal foil labels include its ability to quickly go from non-tacky to tacky, its ability to be used with conventional paper label labeling machines, and its tolerance to immersion in ice-water.

The polymeric film based face stock will provide a label with printability, chemical and dimensional stability, and resistance to cracking, tearing, creasing, wrinkling, abrasion, or any other degradation of the sort experienced by paper labels due to physical or environmental extremes.

The invention also permits the use of the water-based activatable adhesive to fasten a clear or contact clear polymeric film substrate which is reverse printed and then overcoated with the hydrophilic layer to glass or plastic containers using a water base adhesive. In some embodiments where a clear label with images or printing thereon is desired, the adhesive system also desirably forms a contact clear adhesive layer free of opacity, voids or other aberrations that might cause a non-transparent appearance in the adhesive. As used herein, the reference to a "container" includes a surface of an object made of glass, plastic or metals such as dishes, bottles, cans, toys and building materials. Optionally, if a metalized coating of a thin metal film is deposited on the polymeric sheets or rolls, premium quality decorative labels with all of the advantages set forth above will be provided.

The hydrophilic polymer components will be applied in the present invention to the selected polymeric sheet in a continuous or patterned layer to provide the absorptive, wet tack and drying properties that are necessary to enable polymeric sheets to be successfully used as label adhesives on polymeric or glass containers when applied with water-based wet labeling techniques.

The choice of polymeric substrate for the label film will determine the rigidity, deformability or conformability, regrindability, printability and expansion or contraction characteristics required for application to the selected container without the problems associated with paper labels.

In addition, the polymeric film substrate for the substantially clear label will be selected so that it will expand or contract to the same degree as the container so that when ambient conditions change, the label will not pucker or blister.

The polymeric materials include clear, opaque or colored polypropylene, high density polyethylene, polyester, polystyrene, polycarbonate, vinyl or compatibilized blends. In one embodiment, the invention also provides a plastic, metal or glass container having a polymer label comprising a low density polymer, dried water-based adhesive which affixes said polymer label to said container, wherein said polymer label contains a portion of said dried water-based adhesive within said polymer. The use of the low density micro-voided polymer film can allow portions of the water-based adhesive to migrate into the film during the drying cycle to provide an enhanced bond between the polymeric label and the container surface and to also impart stiffness to the dried label on the container surface.

The term "film face stock" or "polymeric label substrate" as used herein should be taken for purposes of the present invention to refer to a material compatible in terms of rigidity, deformability or conformability, and expansion or contraction characteristics with the plastic or glass container to be labeled. Similarly, the "hydrophilic layer" previously mentioned has the properties of wet tack, water adsorption, drying, sufficient adhesion to the polymeric label substrate and affinity and adhesion to the labeling adhesive if used in the wet or dry form.

It is contemplated that in some embodiments selected hydrophilic layers can be wet or remoistened without adhesive for use on a glass, plastic or metal container; or with a water-based adhesive and can be used to affix the polymeric label substrate with the hydrophilic layer to the glass, plastic or metal container.

It is also an aspect of the present invention to optionally use cross-linkable (reactive) components in the adhesive that can cure with a cross-linking agent supplied in the rewetting water or adhesive (if used) that will promote adhesion to the labeled container along with chemical and moisture resistance. Examples of cross-linkable materials are those which contain carboxyl groups, hydroxyl groups or other functional group which will react with a cross-linking agent. The cross-linking agent can also be added to the adhesive which may or may not have reactive components which would cure the adhesive and hydrophilic layer together or the cross-linking agent may only cross-link the hydrophilic layer. When water and a cross-linking agent are combined, the composition will comprise 0.25-10% by wt. of cross-linking agent.

For a co-extruded product, if an adhesion promoting tie layer is employed, materials such as maleic anhydride, (alk) acrylic acid and the like may be employed at levels up to 5% by weight of the hydrophilic composition. For a coated product, if a primer is employed, materials such as chlorinated polypropylene, polyethylene imine (PEI) and the like may be employed at levels of 0.05-1.0 lb/3000 sq. ft.

Plasticizers, such as di-n-octylphthalate, may be employed at a level of 0.5-3, 10 or 15% by weight of the adhesive composition to prevent the polymeric film label from losing flexibility. The polymers of this invention can be prepared in the presence of a plasticizer. The plasticizer can be added at any time during polymer preparation or dispersion or after its manufacture. Plasticizers well known to the art can be selected for use in this invention according to parameters such as compatibility with the particular vinyl polymer and desired properties of the final composition.

Slip aids and anti-blocking compounds prevent excessive friction between the hydrophilic layer and the printed label face and also control the effect of ambient moisture levels which may tend to cause label blocking and interfere with the operation of high speed automated machinery which is used to apply labels. These materials may be used at a level of 0.5-3% by weight of the hydrophilic layer composition and include materials such as microcrystalline wax emulsions, erucamide dispersions, polytetrafluoroethylene compositions, silicone beads, modified silicone solutions, paraffin wax emulsions, high melting polypropylene emulsions, carnauba wax emulsions, oxidized ethylene/EVA compositions, micronized polyethylene wax/PTFE emulsions, micronized polypropylene, micronized fluorocarbons such as PTFE (Teflon™), micronized polyethylene, silica and talc.

If an antistatic agent is employed, it may be present at a level of 0.5-3% by weight of the hydrophilic formulation. These materials include quaternary ammonium salts such as Ethaquad™ C12, sulfonated styrene maleic anhydride, sulfonated polystyrene, sulfonated vinyl toluene maleic anhydride, conductive polymers, organo modified silicones such as Silwet™ L77, inorganic salts and oxides, and metals. Antistatic or static dissipative properties can also be imparted into the adhesive film by nonionic oligomers or polymers such as polyoxyethylene or copolymers of ethylene oxide and propylene oxide. One such polymeric additive is Bisomer™ S10W from Clariant shown in the examples, which is co-polymerizable source of nonionic polymers. Other similar side-chain monomers include Bisomer MPEG350MA=methoxy (polyethyleneglycol) methacrylate, Bisomer MPEG550MA=methoxy (polyethyleneglycol) methacrylate, Bisomer S10W=methoxy (polyethyleneglycol) methacrylate (50% in water), Bisomer S20W=methoxy (polyethyleneglycol) methacrylate (50% in water), Genagen M 750, Genagen M 1100, and Genagen M 2000; all available from Clariant.

In one embodiment, such nonionic oligomers or polymers are present at a concentration of at least 0.1 wt. % based on the weight of the dried adhesive film. In that embodiment, they are present in amounts less than 20, 30, or 50 wt. % based on the weight of the adhesive film. In one embodiment, these nonionic oligomers or polymers are co-polymerizable. The nonionic oligomers or polymers (optionally copolymerized into another polymer of the adhesive) can be present in the hydrophilic polymer, less hydrophilic polymer or the activation solution.

Protective coatings may be used to protect the exposed polymer film of the label when applied at a level of 0.25-4 lbs/3000 sq. ft. using conventional application techniques. These materials include styrenated acrylics such as OC1043 from O.C. Adhesives Inc., urethanes such as AS455 from Adhesion Systems Inc., Flexcon Release Varnish from Manders—Premier.

If desired, a humectant may be added to the adhesive at a level of 0.5-3 or 5 wt. % to provide curl resistance and to impart lay flat properties to the polymeric film labels. These humectants include urea, polyethylene glycols such as PEG400, polyvinyl alcohol, sugar, glycerol, and the like.

If a cross-linking catalyst is added to the adhesion promoting tie layer, the ratio of catalyst to adhesion promoting tie layer may be an amount that is sufficient to cure the adhesion promoting tie layer. An excess of the catalyst, i.e., 5-25% in excess of the amount of the catalyst that is required to cure the adhesion promoting tie layer may be used to provide a portion of the catalyst at the interface of the adhesion tie promoter and the hydrophilic layer to increase the moisture resistance of the hydrophilic layer without decreasing the moisture adsorptivity of the hydrophilic layer. Additionally, excess catalyst can also be available to aid in curing of the adhesive.

Other additives well known to those skilled in the art can be used to aid in preparation of the adhesive of this invention. Such additives include stabilizers, defoamers, antioxidants (e.g., Irganox™ 1010), UV absorbers, activators, colorants, pigments, neutralizing agents, thickeners coalescing agents such as di(propylene glycol) methyl ether (DPM) and PM acetate, waxes, slip and release agents, antimicrobial agents, surfactants, flame retardant additives, antiozonants, and the like. They can optionally be added at an appropriate time as is well known to those skilled in the art.

EXAMPLES

The following tests were used:

Pencil Quick Tack Test Method

The purpose of this test is to evaluate the tack of the adhesive with light pressure immediately after the adhesive has been activated by an aqueous activation solution. A rubber eraser is used as this is similar in composition to the pallets used in conventional paper labeling equipment. It is necessary that the label has sufficient initial tack to stick to the pallet rather than remain with the stack of cut labels. Take a 2"×2" sample of the polymeric film with a hydrophilic label adhesive already thereon. Remove any dust, dirt or foreign material from the surface of the adhesive using mechanical shaking or compressed air. Place the sample with the adhesive side up on a glass plate (e.g., 12" by 12" plates work well). Dip the tip of the pencil eraser (e.g., Stanford Mirado pencils with erasers were used) into the activator solution. Shake the excess activator from the pencil eraser tip. Roll the pencil on a dry paper towel to remove excess activator from the side of the pencil eraser. Quickly and lightly tap the moistened tip of the pencil eraser onto the adhesive. Rate the quick tack by observing how aggressively the sample sticks to the eraser using the following scale. 0=no adhesion, 1=poor adhesion (sample sticks but cannot be lifted by pencil), 2=moderate adhesion (sample lifts with eraser but is easily removed), and 3=excellent adhesion (sample lifts with eraser and requires some force to remove). Repeat the test with a new eraser and average multiple values (5-10). Half unit ratings can be used if performance is midway between one category and the next.

Ice Soak test: Labels with hydrophilic adhesive layer are prepared, activated with activation solution, applied and allowed to dry for 7 days on the substrate at ambient conditions. The samples are then submersed in an ice/cold water bath for 72 hours. After 72 hours, the labeled article is rotated in the bath and labels are evaluated for edge flagging or removal. The labels are then peeled from the substrates and the adhesion is rated according to the following scale. 0=no adhesion, 1=poor adhesion, 2=good adhesion, and 3=excellent adhesion.

Latex A containing acrylonitrile, vinyl alkoxysilane, styrene, 2-ethylhexyl acrylate (EHA), and acrylic acid (AA) in the following proportions was prepared.

Latex A

| Monomer | % | Description |
| --- | --- | --- |
| Acrylic acid | 16 | |
| 2-Ethylhexyl acrylate | 42 | |
| Styrene | 29 | |
| Acrylonitrile | 7 | |
| Methoxypolyethyleneglycol methacrylate; Mn~1,100 Dalton (Bisomer ™ S10W from Cognis) | 2 | Monomer with side-chain PEG (nonionic nature) |
| CoatOSil ™ 1757 from Momentive Performance Materials methacryloxypropyltriisopropoxy silane | 2 | Monomer with protected silanol group |

Example (Latex A)

To a 5-L four-necked glass flask submerged into a water bath and equipped with a stirrer, reflux condenser, thermometer and nitrogen inlet tube, were added: 1940 grams DM water, 80 grams Abex JKB surfactant and 1 gram Surfynol 104H defoamer. In a nitrogen atmosphere, the temperature of the vessel contents was brought to 84° C. and the initiator solution of 9.4 grams ammonium persulfate and 0.2 gram ammonium carbonate in 50 grams DM water was added. Immediately after, the addition of the following monomer pre-emulsion mixture was started over the period of 4 hours: 400 grams DM water, 33 grams Abex JKB, 3 grams ammonium carbonate, 432 grams 2-ethylhexylacrylate, 295 grams styrene, 19 grams CoatOSil™ 1757, 75 grams acrylonitrile, 39 grams Bisomer S10W and 160 grams acrylic acid. Half-hour after the beginning of the monomer pre-emulsion addition, 8 grams ammonium persulfate solution in 163 grams DM water started to be gradually added over the period of 4 hours. The temperature was maintained at 84° C. Half-hour before the end of pre-emulsion addition, the temperature was raised to 87° C. and maintained for 2 hours. Then the contents were cooled to 44° C. and the solution of 1.1 grams 70% tert-butyl hydroxyperoxide and 0.3 gram Abex JKB in 10 grams DM water was added. After 20 minutes of mixing, solution of 1 grain erythorbic acid in 25 grams DM water was added. A clean (i.e., trace coagulum and no grit particles) low-viscosity colloidally stable dispersion was obtained with the following properties: solids content=28%, pH=2.6, particle size=64 nm (PDI=1.3).

Latex B containing acrylonitrile, vinyl alkoxysilane, acrylamido-2methylpropane sulfonic acid sodium salt (AMPS), styrene, 2-ethylhexylacrylate in the following proportions was prepared.

Latex B

| Monomer | % | Description |
| --- | --- | --- |
| Acrylamido-2-methylpropane sulfonic acid sodium salt (AMPS ™) monomer from Lubrizol Corp. | 16 | |
| 2-Ethylhexyl acrylate | 43 | |
| Styrene | 30 | |
| Acrylonitrile | 7 | |
| Methoxypolyethyleneglycol methacrylate; Mn~1,100 Dalton (Bisomer ™ S10W) | 2 | Monomer with side-chain PEG (nonionic nature) |
| CoatOSil ™ 1757 = vinyltriisopropoxy silane | 2 | Monomer with protected silanol group |

Example (Latex B)

To a 3-L four-necked glass flask submerged into a water bath and equipped with a stirrer, reflux condenser, thermometer and nitrogen inlet tube, were added: 1000 grams DM water, 40 grams Abex JKB surfactant and 0.5 gram Surfynol 104H defoamer. In a nitrogen atmosphere, the temperature of the vessel contents was brought to 84° C. and the initiator solution of 4.7 grams ammonium persulfate and 0.1 gram ammonium carbonate in 25 grams DM water was added. Immediately after, the addition of the following monomer pre-emulsion mixture was started over the period of 4 hours: 200 grams DM water, 17 grams Abex JKB, 1.5 grams ammonium carbonate, 216 grams 2-ethylhexylacrylate, 148 grams styrene, 9.5 grams CoatOSil 1757, 38 grams acrylonitrile, 19 grams Bisomer S10W and 160 grams AMPS (50% solution of sodium 2-acrylainido-2-methylpropanesulfonate in water). Half-hour after the beginning of the monomer pre-emulsion addition, 4 grams ammonium persulfate solution in 81 grams DM water started to be gradually added over the period of 4 hours. The temperature was maintained at 84° C. Half-hour before the end of pre-emulsion addition, the temperature was raised to 87° C. and maintained for 1.5 hours. Then, the contents were cooled to 44° C. and the solution of 0.6 grams 70% tert-butyl hydroxyperoxide and 0.2 grain Abex JKB in 5 grams DM water was added. After 20 minutes of mixing, solution of 0.5 gram erythorbic acid in 13 grams DM water as added.

A clean (i.e., trace coagulum and no grit particles) low-viscosity colloidally stable dispersion was obtained with the following properties: solids content=27%, pH=3.9, particle size=144 nm (PDI=1.3).

Latex C. Latex C was similar to Latexes A and B but varied slightly in composition. It was 4 wt. % acrylamido-2-methylpropane sulfonic acid sodium salt, 1.9 wt. % CoatOSil™ 1706, 43.2 wt. % 2-ethylhexyl acrylate, 45.5 wt. % styrene, 7.5 wt. % acrylonitrile, and 1.9 wt. % Bisomer™ S10W. It contained no acrylic acid. Properties were T.S.=27%, pH=2.9, P.S.=136 nm.

An activation solution—1 to 3 wt. % sodium silicate (O® Sodium Silicate Solution from PQ Corporation) in water. The O® Sodium Silicate is a 3.22 weight ratio (SiO$_2$/Na$_2$O) sodium silicate, 38.6% solution in water.

Acrylate solution D. This was used as a hydrophilic polymer to be blended with the less hydrophilic polymer. Acrylate solution D was a water soluble polyacrylic acid polymerized in water to about 300,000 to 400,000 number average molecular weight as determined by GPC. It was about pH 2.2 to 3.0, a clear amber colored, 25% solids solution in water, with a viscosity of 400 to 1200 cP at 25 C and a specific gravity about 1.0 to 1.3.

Acrylate solution E. The E polyacrylate was similar to the D acrylate but was a copolymer of acrylic acid with acrylamide-2-methylpropane sulfonic acid in water to less than 15,000 number average molecular weight. It was a clear, amber colored, 48-50 wt. % solution in water. The pH was about 3.0 to 4.0. It had an acid number of about 450 to 490 mg KOH/g dry polymer.

Preparation of Adhesive film. Latex A having 27-33% solids was mixed with Acrylate E having 50% solids in a weight ratio of 70:30 by dry weight. They were mixed for 5 minutes using a propeller type stirrer. They were then applied to a 2 mil thick polypropylene film supplied by ExxonMobil using a Mayer rod to achieve a dry coating weight of 3 to 4 grams per 1,000 square inches. This was oven dried for 2 minutes at 180° F. The other coatings in the examples were similarly prepared.

The following combinations were run of $1^{st}$ polymer, $2^{nd}$ polymer, and activation solution.

| Polymer 1 Hydrophilic | Polymer 2 Less hydrophilic | Activation Agent | Rating Quick Tack | 72 Hour Ice Soak Rating |
|---|---|---|---|---|
| None | Latex A 100 wt. % | Sodium silicate 1% in water | 0.45 | 1.67 |
| Acrylate D 30 wt. % dry polymer basis | Latex A 70 wt. % dry polymer basis | Sodium silicate 1% in water | 1.25 | 1.17 |
| Acrylate D 30 wt. % dry polymer basis | Latex C 70 wt. % dry polymer basis | Sodium silicate 1% in water | 1.75 | 1.10 |
| None | Latex B 100 wt. % | Acrylate E | 2.3 | 0.00 |
| Acrylate E 30 wt. % dry polymer basis | Latex B 70 wt. % dry polymer basis | Acrylate E | 2.75 | 0.00 |
| Acrylate E 30 wt. % dry polymer basis | Latex A 70 wt. % dry polymer basis | Acrylate E + 4.7 parts of Silquest A-2287 per 100 parts by wt. | 2.25 | 3.00 |

The label adhesive of disclosure has utility for adhering a variety of polymeric substrates to a variety of surfaces such as metal, glass, and polymers including metal, glass and polymer containers such as for beverages and other liquids. It has particular utility as a water activated adhesive. While containers are a preferred embodiment, the adhesive can be used to apply polymeric labels or other polymeric devices to other surfaces using a water or water-based adhesive activation process. Preferably, the adhesive is used in automated equipment operating at speeds of 60 to 1000 or more labels or other polymeric devices per minute being attached in a consecutive fashion on a single line.

Although only a few embodiments of this invention have been described above, it should be appreciated that many modifications can be made without departing from the spirit and scope of the invention. All such modifications can be included within the scope of the invention, which is to be limited only by the following claims. Patents cited for their teachings and enablements are hereby incorporated by reference.

What is claimed:

1. An adhesive system for fastening a non-paper polymeric label or metal foil to a surface, said adhesive system comprising:
   a) a film from at least two polymer fractions comprising a1) at least 5 wt. % of a hydrophilic polymer characterized as being an addition polymer that is a water soluble hydrophilic polymer and a2) at least 50 wt. % of a less hydrophilic polymer being characterized as an addition polymer having a glass transition temperature from about 10° C. to about 50° C. that is not water soluble and
   b) a water-based activation solution, wherein said film and activation solution are characterized by the conversion of said film from a non-tacky state to a tacky state in less than one second upon contact with said water-based activation solution wherein said less hydrophilic polymer is a copolymer comprising repeat units 10-85 wt. % of repeat units derived from $C_1$-$C_{15}$ alkyl esters of (meth)acrylic acid monomer and 5-40 wt. % of repeat units from polar monomer containing carboxylic, sulfonic, sulfate, phosphate, and/or phosphonic acids groups and/or their salts.

2. An adhesive system according to claim 1, wherein at least one of a1, a2, or b comprises from about 0.2 to about 5 wt. % of repeat units from a silicon-containing monomer.

3. An adhesive system according to claim 1, wherein said hydrophilic polymer is a free-radically polymerized polymer having an acid number before neutralization from about 500 to about 1200 mg KOH/g of polymer and said less hydrophilic polymer has an acid number before neutralization of less than 300 mg KOH/g of polymer.

4. An adhesive system according to claim 1, wherein said activation solution comprises a polyacrylic acid homopolymer or copolymer and/or from about 0.5 to about 25 wt. % of sodium or potassium silicate based on the weight of said activation solution.

5. An adhesive system according to claim 1, wherein said film was derived from drying a water-based dispersion and/or solution of said hydrophilic polymer fraction and said less hydrophilic polymer fraction.

6. An adhesive system according to claim 5, wherein said hydrophilic polymer fraction comprises a polymer of less than 500,000 Dalton number average molecular weight.

7. An adhesive system according to claim 1, for adhesion to glass, metal, or plastic surfaces; and optionally said surfaces being part of a glass, metal, or plastic container.

8. An adhesive system according to claim 1 wherein said aqueous activation solution comprises at least 30 wt. % water, wherein said film is characterized by a) going from a dry non-tacky film to a tacky film within 0.1 seconds of activation with said activation solution and wherein after one week of aging said adhesive system maintains adhesion of said label to said surface at least three days in 0+/-1° C. water immersion test.

9. An adhesive system according to claim 8, wherein said less hydrophilic polymer fraction comprises 5-40 wt. % of repeat units from polar monomer containing carboxylic, sulfonic, sulfate, phosphate, and/or phosphonic acid groups and/or their salts.

10. An adhesive system according to claim 8, wherein said adhesive system comprises from about 0.2 to about 5 wt. % of repeating units derived from a silicon containing monomer based on the weight of the polymer.

11. An adhesive system according to claim 8, wherein said activation solution comprises a polyacrylic acid homopolymer or copolymer and/or from about 0.5 to about 25 wt. % of sodium or potassium silicate based on the weight of said activation solution.

12. An adhesive system according to claim 8, wherein said hydrophilic and less hydrophilic addition polymers in the form of a film was derived from drying a dispersion or solution of polymer in water or solvent.

13. An adhesive system according to claim 8, wherein said hydrophilic addition polymer having a bynber average molecular weight less than 500,000 Daltons. comprises a water soluble polyacrylic acid and/or its salt 14. An adhesive system according to claim 8, wherein said less hydrophilic addition polymer –a2) comprises repeating units from 2-ethylhexyl acrylate, styrene, and acrylonitrile.

15. An adhesive system according to claim 6, wherein said hydrophilic polymer fraction comprises repeating units containing carboxylic and/or sulfonic acid and said less hydrophilic polymer fraction comprises a polymer from a dispersion of polymer in water or a latex.

16. An adhesive system according to claim 1, wherein said less hydrophilic polymer includes a nonionic dispersion stabilizer as a part of the polymer or as a separate component.

17. An adhesive system according to claim 16, wherein said nonionic dispersion stabilizer is selected from the group consisting of a chain transfer agent, monomer, polymerization initiator, separate additive and a surface active agent.

18. An adhesive system according to claim 17, wherein said nonionic dispersion stabilizer includes a residue from a copolymerizable (meth)acrylic monomer containing a poly(alkylene oxide) chain having at least 50 wt. % repeating units from ethylene oxide based on the weight of said poly(alkylene oxide) chain.

19. An adhesive system according to claim 8, wherein said hydrophilic polymer characterized as being an addition polymer that is a water soluble hydrophilic polymer includes a nonionic oligomer or polymer.

20. An adhesive system according to claim 1, wherein said adhesive system forms a contact-clear adhesive layer free of opacity, voids or other aberrations that might cause a non-transparent appearance in the adhesive when used to adhere a label to a surface.

* * * * *